(12) United States Patent
Alameh et al.

(10) Patent No.: US 11,146,565 B2
(45) Date of Patent: Oct. 12, 2021

(54) MOBILE ELECTRONIC COMMUNICATIONS DEVICE HAVING MULTIPLE DEVICE PATHS

(71) Applicant: Motorola Mobility LLC, Chicago, IL (US)

(72) Inventors: Rachid Alameh, Crystal Lake, IL (US); Jarrett Simerson, Glenview, IL (US); Thomas Gitzinger, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/203,209

(22) Filed: Nov. 28, 2018

(65) Prior Publication Data

US 2020/0169612 A1    May 28, 2020

(51) Int. Cl.
| | | |
|---|---|---|
| *H04L 29/06* | (2006.01) | |
| *H04L 29/08* | (2006.01) | |
| *G06F 21/32* | (2013.01) | |

(52) U.S. Cl.
CPC ............ *H04L 63/102* (2013.01); *G06F 21/32* (2013.01); *H04L 63/08* (2013.01); *H04L 63/0861* (2013.01); *H04L 63/10* (2013.01); *H04L 67/1097* (2013.01); *H04L 67/141* (2013.01); *H04L 67/142* (2013.01); *H04L 67/22* (2013.01); *H04L 67/30* (2013.01); *H04L 67/303* (2013.01); *H04L 67/306* (2013.01)

(58) Field of Classification Search
CPC ..... H04L 67/30; H04L 67/303; H04L 63/102; H04L 67/306; H04L 63/105; H04L 67/22; H04L 63/10
See application file for complete search history.

(56) References Cited

U.S. PATENT DOCUMENTS

| | | | |
|---|---|---|---|
| 9,195,388 B2 * | 11/2015 | Shepherd | ................. G06F 21/32 |
| 9,916,481 B2 * | 3/2018 | Fitzgerald | ................ G06F 21/31 |
| 2008/0032682 A1 * | 2/2008 | Jung | ................. H04W 12/0027 455/418 |
| 2008/0103531 A1 * | 5/2008 | Ginggen | ................ A61M 5/172 607/2 |
| 2010/0199162 A1 * | 8/2010 | Boucard | ................. G06F 21/32 715/224 |
| 2011/0265179 A1 * | 10/2011 | Newman | ................ G06F 21/604 726/22 |

(Continued)

*Primary Examiner* — Ramy M Osman

(57) ABSTRACT

Systems and methods for providing multiple paths through a mobile electronic device entail providing one of multiple levels of device access and cloud access based on an identity determination and authentication as to a potential user. In an embodiment, the device attempts to identify the user based on traditional touch/touchless authentication techniques. If this attempt is unsuccessful, the device then tries to identify the user by alternative means. If the user can be identified, the device attempts to authenticate the user for full access to the device and associated cloud data. If this is successful, the user is granted full access. If instead the identified user is not qualified for full access, the user is given pass-through access to their personal cloud storage. If, however, the device is unable to even identify the user, the user may be given pass-through access to the cloud generally.

20 Claims, 8 Drawing Sheets

(56) References Cited

U.S. PATENT DOCUMENTS

| | | | |
|---|---|---|---|
| 2013/0005488 A1* | 1/2013 | Evans | G06F 21/31 |
| | | | 463/43 |
| 2013/0340034 A1* | 12/2013 | Rich | H04N 21/8166 |
| | | | 726/1 |
| 2014/0201824 A1* | 7/2014 | Agbabian | H04L 63/08 |
| | | | 726/6 |
| 2015/0128215 A1* | 5/2015 | Son | H04L 63/102 |
| | | | 726/2 |
| 2016/0007007 A1* | 1/2016 | Nevet | G06F 21/35 |
| | | | 726/19 |
| 2016/0021116 A1* | 1/2016 | Maguire | H04L 63/102 |
| | | | 726/4 |
| 2017/0195162 A1* | 7/2017 | Salpico | H04L 63/083 |
| 2017/0223005 A1* | 8/2017 | Birgisson | H04L 63/0807 |
| 2018/0059913 A1* | 3/2018 | Penilla | H04L 67/12 |
| 2019/0014108 A1* | 1/2019 | Rothschild | H04L 63/102 |
| 2019/0087592 A1* | 3/2019 | Gray | H04L 63/083 |

* cited by examiner

MOBILE ELECTRONIC COMMUNICATIONS DEVICE HAVING MULTIPLE DEVICE PATHS

TECHNICAL FIELD

The present disclosure is related generally to mobile electronic communications devices and, more particularly, to systems and methods for facilitating user interactions with a user interface of a mobile electronic communications device.

BACKGROUND

As mobile devices such as cell phones and smart phones have become smaller and more convenient, they have also become more multipurpose and sharable. However, the amount and character of user data stored on smartphones tends to discourage sharing of devices. For example, many users employ a common core of the same applications (apps) on their smartphones, but are nonetheless reluctant to share their devices with other users for fear of exposing their personal data to that other user.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objectives and advantages, may be best understood from the following detailed description taken in conjunction with the accompanying drawings of which:

DETAILED DESCRIPTION

Before discussing embodiments of the disclosed principles in full detail, an overview of certain embodiments is given to aid the reader in understanding the later more detailed discussion. As noted above, mobile devices such as cell phones and smart phones are typically small and convenient enough to allow easy sharing of devices among users. However, the existence of particularized user data on most smartphones tends to discourage sharing of such devices out of a fear of exposing their personal data to other users.

In an embodiment of the disclosed principles, if an authenticated user of a device is determined to be the owner of the device, that user is given full access to the device content and its associated remote data (e.g., "cloud data"). If a user of the device is not the device owner, then that user is not given access to device content but is provided with pass-through access to a guest cloud or their own personal cloud via same device.

For example, when a user faces a device implementing an embodiment of the disclosed principles, the device attempts to authenticate the user via touch or touchless means to determine user identity. This process may utilize device carry/placement mode assessment, user gaze direction assessment and other cues and data. When the user identity is determined, the user is then given access to device content if appropriate, or is instead provided with pass-through access to their cloud data.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
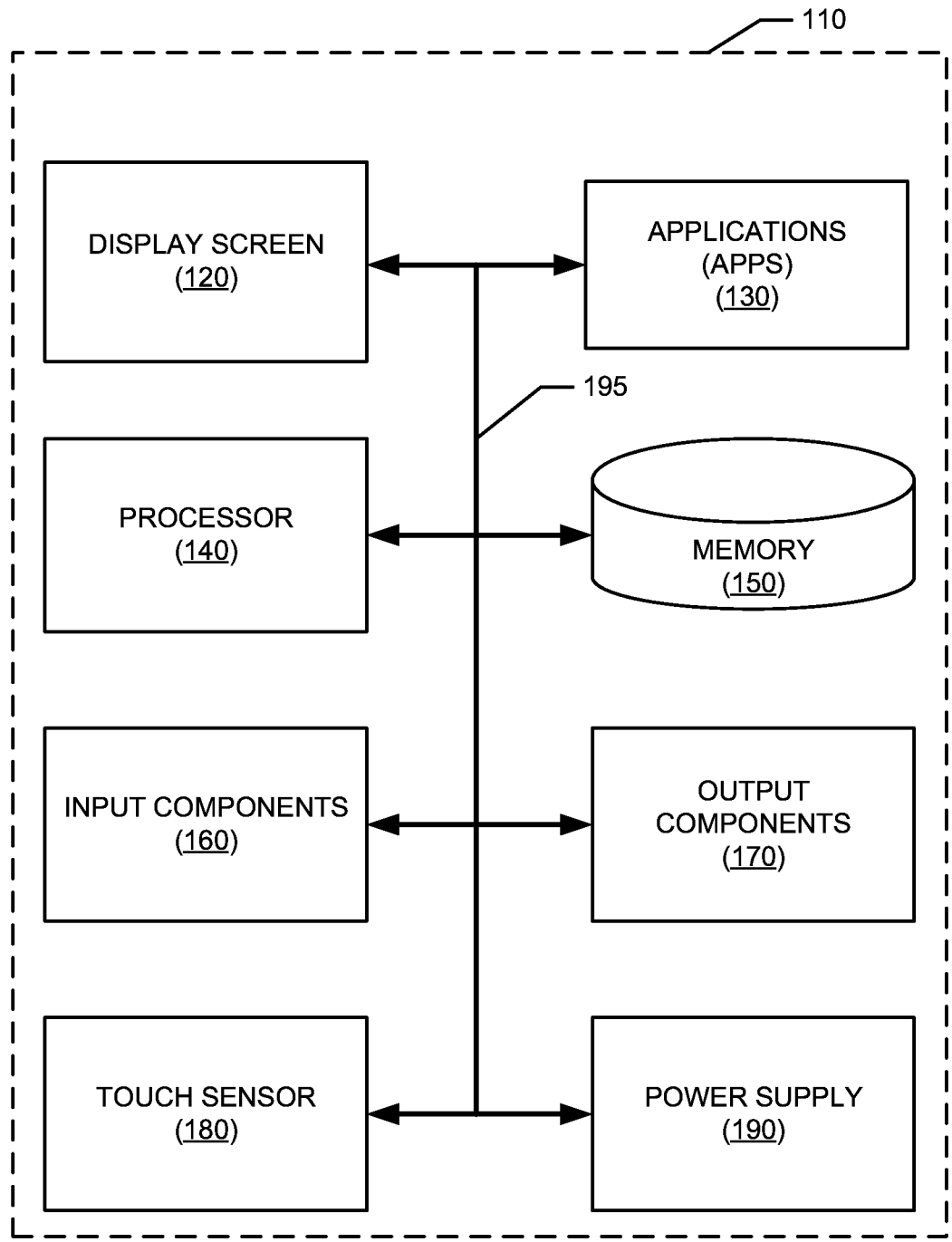
FIG. 1 is a schematic representation of a mobile electronic device in which various embodiments of the disclosed principles may be implemented.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example, one or more antennas and associated circuitry and logic. The antennas and associated circuitry may support any number of protocols, e.g., WiFi, Bluetooth, cellular, etc.

The device 110 as illustrated also includes one or more output components 170 such as RF (radio frequency) or wired output facilities. The RF output facilities may similarly support any number of protocols, e.g., WiFi, Bluetooth, cellular, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments. In an embodiment, one or more touch sensors 180 provide touch detection to detect a user's finger touch on, for example, the device screen.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display and may or may not include the one or more touch sensors 180.

Figure 2:
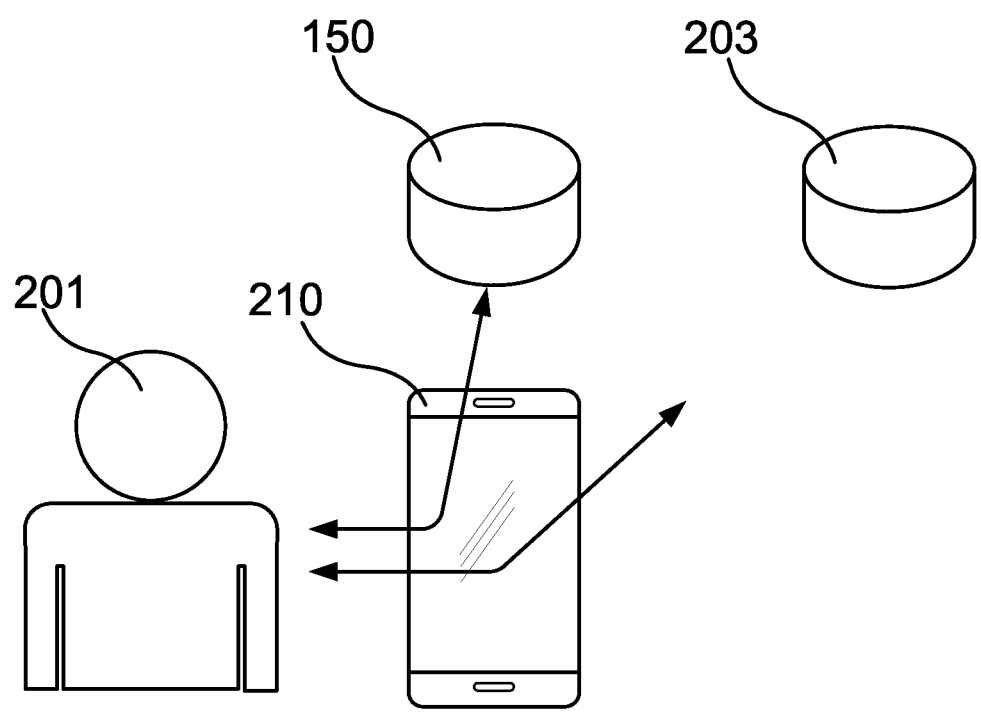
FIG. 2 is a schematic drawing showing a device environment within which embodiments of the disclosed principles may be implemented.

FIG. 2 is a schematic view of a device 210 (110) and device environment within which embodiments of the described principles may be implemented. In the illustrated scenario, a device owner 201 is accessing his or device 210 with respect to both locally stored data, in device, in memory 150, and remote cloud data on a remote storage device 203, e.g., a remote server. Although the remote storage 203 is shown to be accessed via a wireless connection 205, it will be appreciated that any suitable means of connection, be it direct or indirect, networked or otherwise, may be used to communicate between the device 210 and the remote storage device 203.

Figure 3:
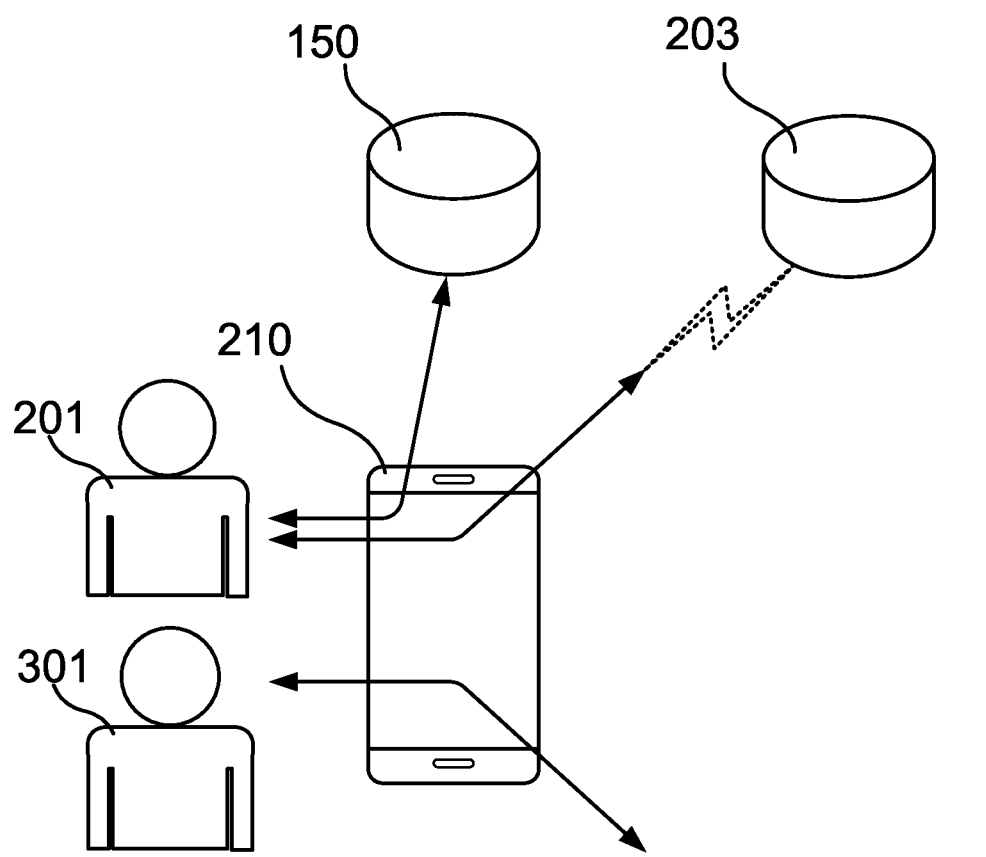
FIG. 3 is a schematic drawing showing a device environment within which embodiments of the disclosed principles are implemented.

As noted above, it is possible within various embodiments of the described principles, for a second user to also use the device 210 to access limited data. This scenario is shown in FIG. 3. In particular, as can be seen, the second user 301 has accessed the device 210 and is accessing remote storage 303 via the device 210. In this embodiment, the remote storage device 303 provides cloud data associated with the second user 301. Still, the second user 301 is not given access to the local or remote data of the first user. That is, data stored in the internal storage 150 of the device 210 and data stored in the first user's remote storage 203 are not accessible by the device 210 during usage by the second user 301. In certain environments and upon the request of an authenticated owner, the owner may grant a $2^{nd}$ user limited access to device stored data or owner associated cloud data (e.g., music). In this embodiment, the described behavior may be enabled by the owner via a device menu for example.

In operation, when the user picks up the device 210, the device 210 attempts to authenticate the user via touch or touchless authentication to determine user identity. To enable authentication, the device 210 may evaluate device carry/placement mode assessment (e.g., handheld or on a tabletop, user nearby or far from device). The device 210 may also evaluate the user's gaze direction (e.g., whether the user looking/staring at device). If the user is looking at the device 210, touchless authentication may be used. In an embodiment of the described principles, the device may monitor and interpret the user voice and identity as another form of touchless authentication.

Upon determining user identity, the device 210 determines whether the user so identified is authorized for access to device content. If the user is authorized for device access, the user is given unrestricted access to the device 210. However, if the user is not authorized for device access, the device 210 creates a pass-through access to the user's own cloud storage. In essence, the device 210 becomes a general cloud vehicle in this scenario, but its data is not made accessible.

Touchless authentication techniques may include, for example, imaging, depth sensing, iris recognition, voice recognition or otherwise, and may be driven by device carry mode and user separation. For example, touchless authentication may be triggered when the device is brought to a stationary state or when the user is captured gazing/looking at the device screen. Depth sensing may be used as another dimension of facial profiling to supplement touchless authentication with anti-spoofing. This prevents the use of a photograph of an authorized user to trick the device 210 into determining that the potential user is the authorized user.

If the user is not recognized by the device 210, as determined via failed device authentication or as determined via lack of a proximity-triggered IR/RF/Wireless security beacon communication from a wearable on the user, the user is given pass-through access to the internet, but is given no access to device content or private cloud content associated with an authorized user of the device 210. As will be seen, access rights can be broken into three categories: the first is for the device owner (who is granted full access to device and cloud), the second is for a person known to the owner or relative (who is granted access to a guest cloud and/or partial limited access to device content set by the owner), and the third is for unknown persons, who are only granted access to a general cloud.

In an embodiment, if a potential user fails authentication but their identity can be ascertained by the device 210 (e.g., based on prior engagement or identification as a family or friend), or communicated by a wearable wireless authenticated key, or otherwise, the user is given access to that user's personal cloud data. The user may also mirror this data on the device 210 without accessing device content, e.g., by using a virtual window to the cloud via the device 210.

In an embodiment, the identified but unauthenticated user is permitted to physically download cloud data into local device guest RAM with no access to device content. In an embodiment, if the user's identity cannot be determined, the device 210 may provide the user with general cloud access ("guest cloud access"). In this way, the device 210 acts as content storage and cloud access for its owner, as a virtual window to the internet for unknown users, and as a virtual window to the personal cloud for a non-authenticated but identified user.

Once given, the termination of cloud access for non-authenticated users is initiated via a timer in an embodiment of the disclosed principles. In other embodiments, termination is triggered by a determination that the device owner is now using the device, a determination that the non-authenticated user is no longer looking at device 210, or a determination that a different user is now operating the device. Once terminated, any data stored in cloud RAM, that is, mirrored on the device 210 in guest RAM, is erased to protect the terminated user's privacy, and cloud access is terminated.

From a practical standpoint, the operations described herein may be initiated by the device owner via downloading of the implementing app into the device 210. The App governs the device operation and grants access to device 210 following authentication or non-authentication as described above. For example, it is the app that launches a browser for cloud access when the potential user is determined not to be the device owner, and prevents access to or viewing of other device data or apps. In an embodiment, if a child user is known but is not the device owner, the child may be allowed to access specific applications on the device, e.g., harmless children's games etc.

In an alternative embodiment, the cloud access feature is only enabled when both the device owner and the potential user are both looking at device 210 at the same time (or one after the other quickly). The presence of the owner with the user may trigger that feature initially. This embodiment may be appropriate in situations wherein the device owner does not entirely trust the potential user, e.g., when the potential user is unknown to the device owner or the circumstances otherwise counsel caution.

Figure 4:
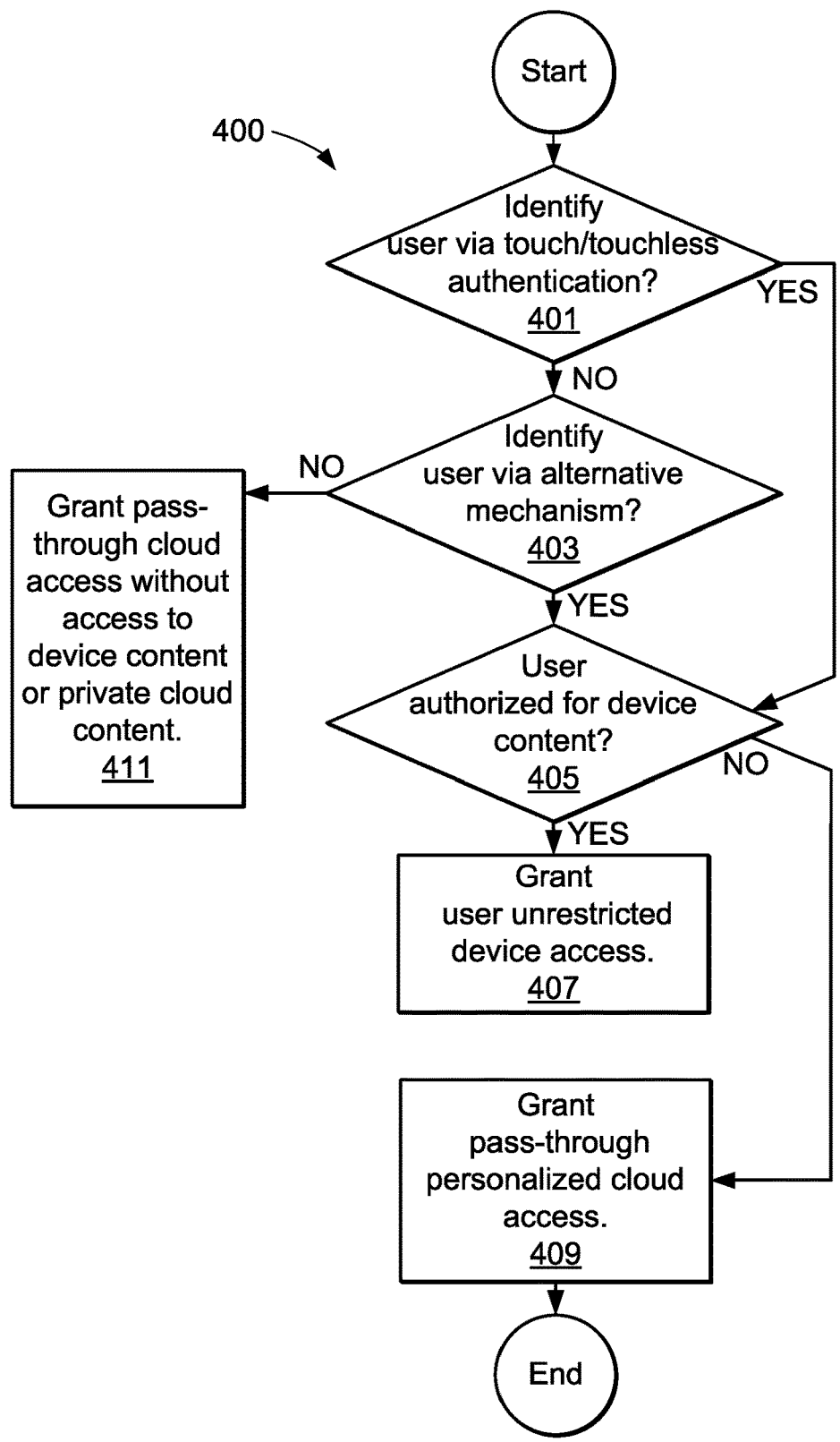
FIG. 4 is a flow chart showing a process of user qualification and access control in accordance with an embodiment of the disclosed principles.

Turning to FIG. 4, this figure illustrates an operating process 400 of user qualification and access control in accordance with an embodiment of the disclosed principles. At stage 401 of the process 400, the device 210 attempts to identify the user via touch or touchless authentication techniques such as those mentioned above or others, and as noted, the device 210 may also evaluate device carry or placement, or user gaze characteristics.

If the device 210 is able to determine user identity via authentication at stage 401, the process 400 flows to stage 405; otherwise the process 400 flows from stage 401 to stage 403, wherein the device 210 attempts to determine the user's identity via other means, e.g., based on prior engagement or by identifying the user by proxy as a family member or friend, or based on a wearable wireless authentication key, or otherwise.

If the device 210 is able to identify the user at either of stages 401 and 403, the device 210 flows to stage 405 to determine whether the identified user is authorized for access to device content (e.g., is an owner of the device 210). If it is determined at stage 405 that the user is authorized for device access, the user is given unrestricted access to the device 210 at stage 407. Otherwise, that is, if the user is known but is not authorized for device access (e.g., is an owner of the device 210), the device 210 provides pass-through access to the user's (not owner's) own cloud storage at stage 409. The user may also be given limited device data access, e.g., to music data.

Returning to stage 403, if the device 210 has been unable to identify the user, the process 400 flows to stage 411, wherein the user is given pass-through access to the internet, without access to device content or private cloud content.

As noted above, the termination of cloud access for non-authenticated users may be triggered via a timer or by a determination that the device owner is now using the device. Alternatively or additionally, termination may be triggered by a determination that the non-authenticated user is no longer looking at device 210 or that a device operator change has occurred. In an embodiment, the device 210 bases a termination timing decision on whether the device 210 is in a public or private environment, e.g., to terminate when the device 210 enters a public environment. After termination, any data on the device 210 associated with the session, e.g., data in guest RAM, is deleted to protect the terminated user's privacy.

Figure 5:
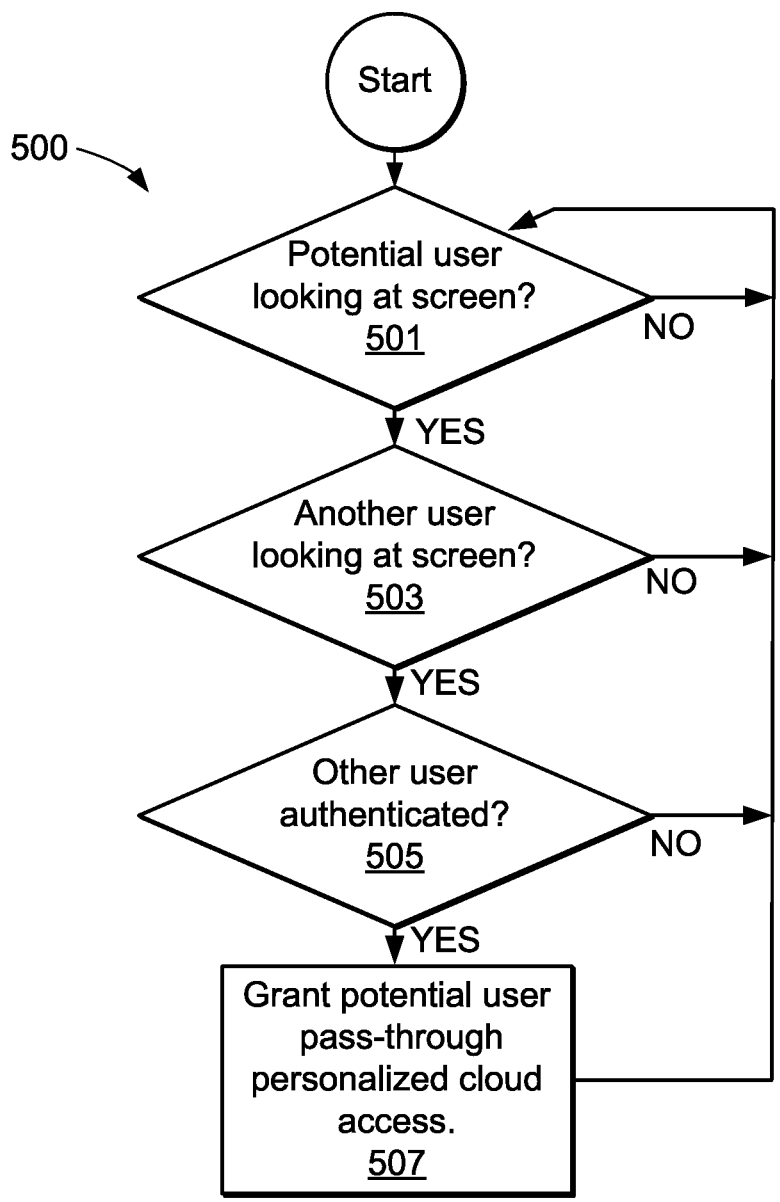
FIG. 5 is a schematic drawing showing a device environment within which an embodiments of the disclosed principles are implemented with respect to device access by an unauthorized user in the presence of an authorized user.
Figure 6:
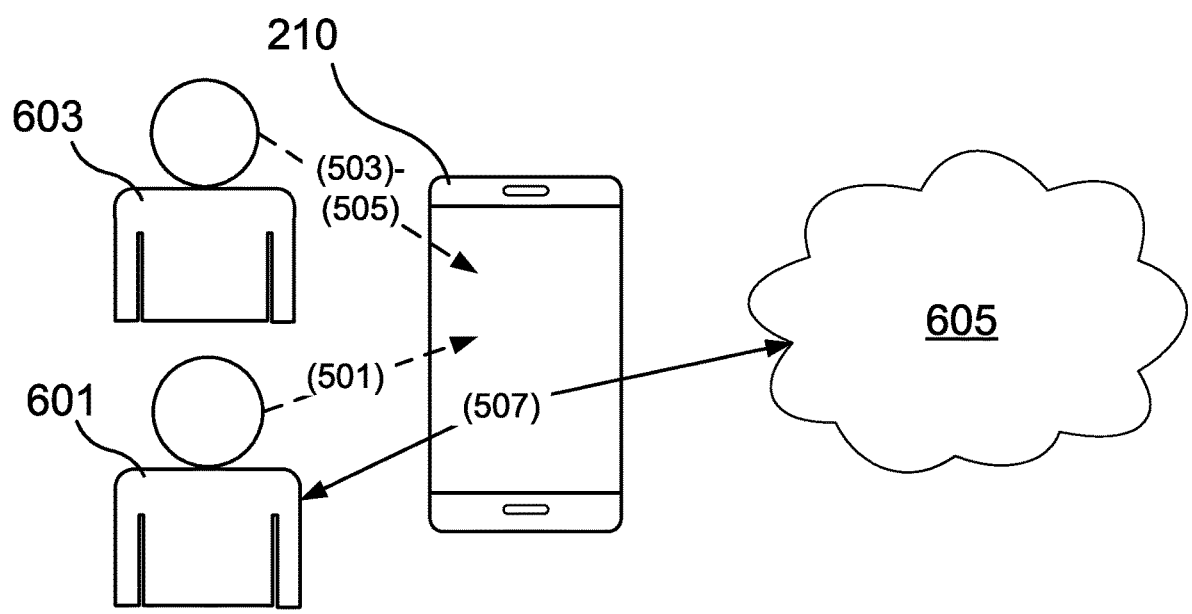
FIG. 6 is a flow chart showing a process of user qualification and access control in accordance with the embodiment shown in FIG. 5.

Turning to FIGS. 5 and 6, these figures provide a data flow and environment schematic respectively in accordance with an additional embodiment of the disclosed principles. In particular, as noted briefly above, cloud access may be enabled when the device owner and the potential user are both looking at device 210 simultaneously or in rapid succession, e.g., within 5 (five) seconds of one another or within another programmed time. The presence of the owner with the user may trigger that feature initially.

This embodiment may be appropriate in situations wherein the device owner does not entirely trust the potential user, e.g., when the potential user is unknown to the device owner or the circumstances otherwise counsel caution. The following discussion will explain the process 500 of FIG. 5 with reference to the environment shown in FIG. 6.

At stage 501 of the process 500 representing this embodiment, the device 210 determines whether the potential user 601 is looking at the device 210 screen. This may be accomplished via facial detection and eye detection, wherein the device 210, using its camera, detects a face and further detects that the eyes associated with the face are directed at the device 210.

If the potential user 601 is not looking at the device 210, the process 500 loops at stage 501, awaiting this prerequisite condition. If however, the potential user 601 is detected to be present and looking at the device 210, the device 210 then determines at stages 503-505 whether a device owner is also looking at the device 210, or has been looking at the device 210 within a predetermined window period.

Thus at stage 503, the device 210 determines whether another person 603 is present and looking at the screen. This may be accomplished in the same manner that the potential user was detected. If it is determined that another person 603 is not present, the process returns to stage 501. Otherwise, the process continues to stage 505, wherein the device 210 attempts to authenticate the additional person 603 as the device owner. This may be accomplished via facial recognition (not just detection), iris recognition, voice recognition and so on. If the additional person 603 cannot be authenticated, the process 500 returns to stage 501. Otherwise, if the additional person 603 is authenticated, the process flows to stage 507, wherein full pass-through access in enabled, allowing the potential user 601 to access a network such as the internet 605 via the device 210. The process 500 may periodically return to stage 501 to ensure that the conditions for allowing pass-through access still exist.

Figure 7:
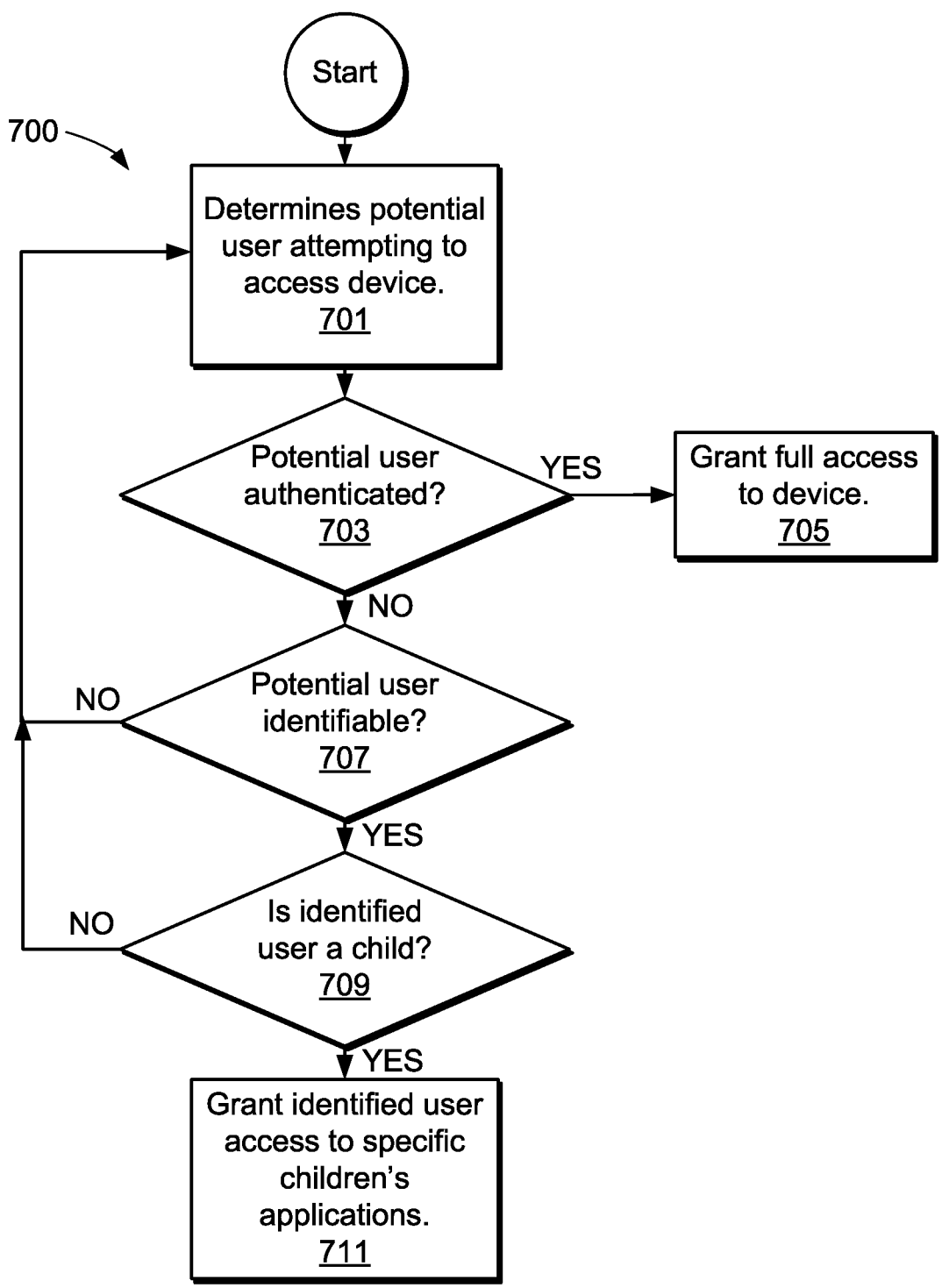
FIG. 7 is a schematic drawing showing a device environment within which an embodiments of the disclosed principles are implemented with respect to device access by a child user.
Figure 8:
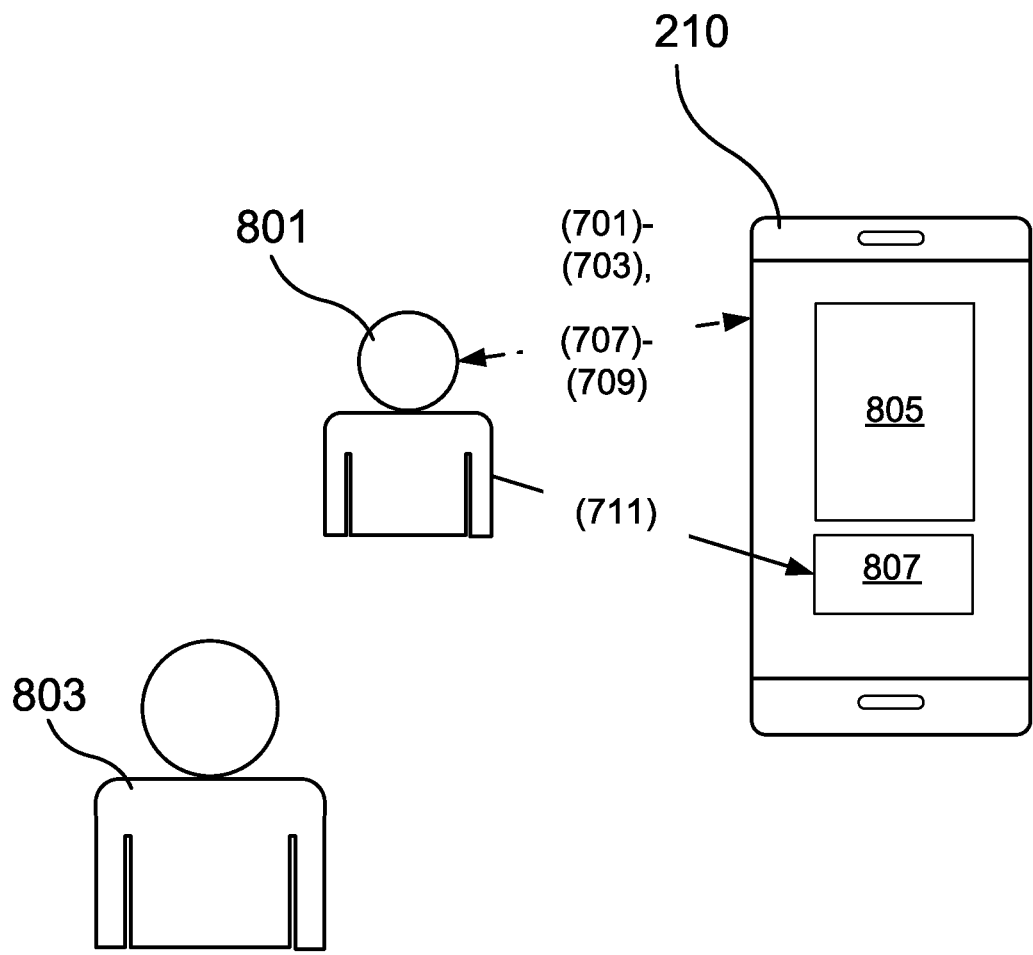
FIG. 8 is a flow chart showing a process of user qualification and access control in accordance with the embodiment shown in FIG. 7.

In another embodiment described in greater detail in FIGS. 7 and 8, if a potential child user 801 is known but is not the device owner 803, the child user 801 may be allowed to access specific applications 805 on the device 210. These specific applications 805 may include children's games, children's videos and other child-specific or suitable general interest content, but exclude other content 807 on the device 210.

The process 700 of FIG. 7 will be described within this environment. At stage 701 of the process 700, the device 210 determines that a potential user 801 is attempting to access the device 210. The device 210 then attempts to authenticate the potential user 801 at stage 703. If the user can be authenticated, then the process flows to stage 705, wherein the potential user 801 is granted full access to data stored on the device 210 as well as any appropriate network access. Otherwise the process 700 flows to stage 707, wherein the device 210 attempts to identify the potential user 801.

If the user 801 is not known, the process 700 restarts. Otherwise, the process determines whether the now-known user 801 is a child at stage 709, and if so, grants the now-known user 801 access at stage 711 to the specific children's applications 805. If however, the now-known user 801 is determined not to be child, the process 700 restarts.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device having multiple device paths comprising:
a local non-transitory memory medium assigned to store user data associated with an owner of the device;
a network connection configured to selectively access a network for access to resources on the network; and
a processor configured to detect a potential user, attempt to identify the potential user, and select and expose to the potential user one of a first path through the device and a second path through the device based on an identity of the potential user, wherein the first path includes the local non-transitory memory medium, including at least a portion of the user data stored therein, and the second path includes only the network connection;
wherein the first path further includes cloud storage associated with the owner of the device;
wherein the second path further includes cloud storage associated with a specific individual other than the owner of the device and limited local device access;
wherein the second path further includes a mirror of cloud content locally on the device;
wherein the mirror of cloud content locally on the device is erased when a different user interacts with the device.

2. The mobile electronic communications device in accordance with claim 1, wherein the attempt to identify the potential user comprises an evaluation of a placement mode assessment of the mobile electronic communications device.

3. The mobile electronic communications device in accordance with claim 1, wherein the attempt to identify the potential user results in a determination that the potential user is the owner of the device, and wherein the processor is further configured to select and expose the first path in response to said determination.

4. The mobile electronic communications device in accordance with claim 1, wherein the attempt to identify the potential user comprises a touchless attempt to identify the potential user.

5. The mobile electronic communications device in accordance with claim 1, wherein the attempt to identify the potential user results in a determination that the potential user is the specific individual, and wherein the processor is further configured to select and expose the second path in response to said determination.

6. The mobile electronic communications device in accordance with claim 5, wherein the processor is further configured to select and expose a third path if the attempt to identify the potential user results in a determination that the potential user is neither the owner of the device nor the specific individual, wherein the third path includes the cloud storage but excludes the cloud storage associated with the specific individual, the cloud storage associated with the owner of the device, and the user data stored in the local non-transitory memory medium.

7. The mobile electronic communications device in accordance with claim 6, wherein the processor is further configured to deselect the third path and instead select and expose the second path if the device receives user identifying information from the cloud storage associated with the specific individual that identifies the potential user.

8. The mobile electronic communications device in accordance with claim 6, wherein the processor is further configured to deselect the third path and instead select and expose the second path if the device receives user identifying information from another local device that identifies the potential user.

9. The mobile electronic communications device in accordance with claim 8, wherein the another local device is a wearable device.

10. The mobile electronic communications device in accordance with claim 9, wherein the user identifying information is supplemented by a location context of the potential user.

11. The mobile electronic communications device in accordance with claim 5, wherein the processor is further configured to select and expose a third path if the potential user is neither the owner of the device nor the specific individual, but the owner of the device is detectably present with the potential user.

12. The mobile electronic communications device in accordance with claim 11, further comprising at least one of an imager and a fingerprint scanner, and wherein the processor is further configured to use at least one of the imager and fingerprint scanner to determine that the owner of the device is detectably present.

13. The mobile electronic communications device in accordance with claim 1, wherein the first path provides unrestricted access to the mobile electronic communications device.

14. The mobile electronic communications device in accordance with claim 1, wherein the second path provides access to the cloud storage associated with the specific individual without providing access to the user data.

15. The mobile electronic communications device in accordance with claim 1, wherein the processor is further configured to select and expose a third path if the attempt to identify the potential user results in a determination that the potential user is neither the owner of the device nor the specific individual, wherein the third path allows Internet access but excludes the cloud storage associated with the specific individual, the cloud storage associated with the owner of the device, and the user data stored in the local non-transitory memory medium.

16. The mobile electronic communications device in accordance with claim 1, wherein the attempt to identify the potential user results in a determination that the potential user is the specific individual, and wherein the processor is further configured to select and expose a subset of the user data in response to receiving an exposure request from the owner of the mobile electronic communications device.

17. The mobile electronic communications device in accordance with claim 16, wherein the subset of the user data comprises one or more predefined applications when the specific individual is a child.

18. The mobile electronic communications device in accordance with claim 1, wherein the attempt to identify the potential user occurs when the mobile electronic communications device is in a stationary state.

19. The mobile electronic communications device in accordance with claim 1, wherein the attempt to identify the potential user results in a determination that the potential user is the specific individual, and wherein the processor is further configured to temporarily select and expose the second path in response to said determination.

20. The mobile electronic communications device in accordance with claim 1, wherein the attempt to identify the potential user results in a determination that the potential user comprises both the owner of the device and the specific individual, and wherein the processor is further configured to select and expose the second path in response to said determination.

* * * * *